(12) United States Patent
Cao et al.

(10) Patent No.: US 9,087,117 B2
(45) Date of Patent: Jul. 21, 2015

(54) METHOD AND SYSTEM FOR VISUALIZATION OF DATA SET

(75) Inventors: Nan Cao, Beijin (CN); Lei Shi, Beijin (CN); Jimeng Sun, White Plains, NY (US); Wei Hong Qian, Beijin (CN); Shixia Liu, Beijin (CN)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 12/917,469

(22) Filed: Nov. 1, 2010

(65) Prior Publication Data

US 2014/0082024 A1  Mar. 20, 2014

(30) Foreign Application Priority Data

Oct. 30, 2009 (CN) .......................... 2009 1 0211313

(51) Int. Cl.
*G06F 17/30* (2006.01)
(52) U.S. Cl.
CPC .... *G06F 17/30601* (2013.01); *G06F 17/30572* (2013.01)
(58) Field of Classification Search
USPC ........................................................ 707/736
See application file for complete search history.

(56) References Cited

U.S. PATENT DOCUMENTS

| | | | |
|---|---|---|---|
| 6,151,595 A * | 11/2000 | Pirolli et al. | 1/1 |
| 2008/0104225 A1* | 5/2008 | Zhang et al. | 709/224 |
| 2009/0097733 A1* | 4/2009 | Hero et al. | 382/133 |
| 2011/0179370 A1* | 7/2011 | Cardno et al. | 715/771 |

OTHER PUBLICATIONS

Michael Joseph Aramini, "Implementation of an Improved Contour Plotting Algorithm," B.S, Univeristy of Illinois at Urbana-Champaign, Thesis, 1981, pp. 1-63.

* cited by examiner

*Primary Examiner* — Amresh Singh
(74) *Attorney, Agent, or Firm* — Cantor Colburn LLP

(57) ABSTRACT

The invention provides a method and system for visualization of a data set, the method comprises: dividing the data set into a plurality of information layers based on different information dimensions; and visually processing the plurality of information layers based on different information dimensions, respectively, in order to present respective views of the plurality of information layers. In the present invention, by visualizing the data set through presenting different overviews of the data set from different information dimensions, respectively, the presentation of comprehensive information of the data set to a data set analyst is ensured while distortion of presented contents as well as visual clutter are prevented.

20 Claims, 11 Drawing Sheets

METHOD AND SYSTEM FOR VISUALIZATION OF DATA SET

TECHNICAL FIELD

The present disclosure relates to the field of data processing, and more specifically, to a method and system for visualization of data set.

TECHNICAL BACKGROUND

A social network is a social structure made of a plurality of nodes (which generally represent individuals or organizations) that are tied by one or more specific types of interdependency, such as financial relationship, interpersonal relationship, social relationship, etc. The social network as a nature structure emerges from our daily life and it may reveal quite a lot insight from the relationships among nodes.

Therefore, social network analysis becomes one of the most important research topics since year 1964, and has now moved to be a paradigm, with its own theoretical statements, methods, social network analysis software, and researchers.

For the social network analysis, visualization is an important technology that may provide great convenience. Currently, the visualization of the social network can be categorized into two major types. The first type is such a visualization method as illustrated in a node link diagram shown in FIG. 1(a), that only presents interdependency among nodes while ignoring context information of the nodes; and the second type is such a visualization method as illustrated in FIG. 1(b), that not only presents interdependency among nodes but also presents the context information of the nodes.

In the social network analysis, an analyst's study of the social network not only focuses on the topology of the social network, but also takes context information behind each node in the social network into account.

Therefore, since the first type of visualization method of the social network does not present context information behind nodes, it suppresses the easy development of the social network analysis.

Furthermore, in the second type of visualization method of the social network, even though the context information of nodes is presented, if the presentation layout is disordered, the social network analysis will also can not be facilitated to carry out effectively. For example, it may be seen that, in the visualization method illustrated in FIG. 1 (b), an extreme visual clutter is caused due to an inappropriate presentation manner in which a variety of context information of a huge number of nodes is presented simultaneously on a single view.

Furthermore, a data set of a network is usually multi-dimensional, i.e. contains a plurality of property information. However, in the second type of visualization method, in addition to the possible case of clutter of presentation layout as shown in FIG. 1 (b), there also exists a case of compression of high-dimension (a plurality of properties) of context information to low- dimension (one or few properties) of context information. In this case, since the majority of context information of nodes is omitted, a distortion of presented contents will be caused.

These above issues not only exist in the case of visualization of the social network, but also exist in the case of visualization of other content-based networks, such as SMS (Short Message Service) network, Internet, etc.

SUMMARY OF THE INVENTION

In view of the above problems, the present disclosure provides a method and system for visualization of a data set, so as to visualize the data set by presenting different overviews of the data set from different information dimensions of the data set, respectively, thereby ensuring presentation of comprehensive information of the data set to a data set analyst, while preventing distortion of presented contents as well as visual clutter.

According to one aspect of the present disclosure, a method for visualization of a data set is provided, comprising: dividing the data set into a plurality of information layers based on different information dimensions; and visually processing the plurality of information layers based on different information dimensions, respectively, in order to present respective views of the plurality of information layers.

According to another aspect of the present disclosure, a system for visualization of a data set is provided, comprising: layering unit configured to divide the data set into a plurality of information layers based on different information dimensions; and visualizing unit configured to visually process the plurality of information layers based on different information dimensions, respectively, in order to present respective views of the plurality of information layers.

If the invention is used, a data set will be visualized by presenting different overviews of the data set from different information dimensions of the data set, so that a data set analyst can obtain different information on the data set from different perspectives according to his/her own needs, thereby facilitating the carrying out of the data set analysis.

BRIEF DESCRIPTION OF THE DRAWINGS

It is believed that the features, advantages, and objectives of the present disclosure will be better understood from the following detailed description of the embodiments of the present invention, taken in conjunction with the drawings, in which.

DETAILED DESCRIPTION

Next, a detailed description of the preferred embodiments of the present invention will be given with reference to the drawings.

Figure 2:
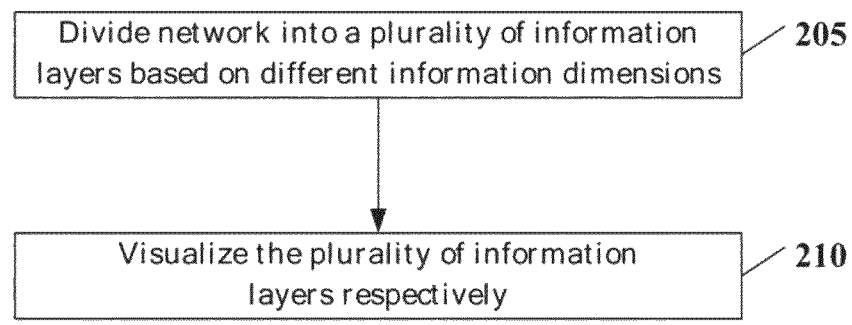
FIG. 2 is a flowchart of a method for visualization of a network according to an embodiment of the present disclosure.

As shown in FIG. 2, the method for visualization of the network of the embodiment divides a data set of the network into a plurality of information layers based on different information dimensions at step 205, wherein each information layer of an information dimension consists of data of the information dimension in the data set of the network.

At this step, the network may be divided in terms of information layer based on any information dimension contained in the data set of the network. For example, for a paper-related network, it may be appreciated that a paper data set will contain multiple dimensions of information, such as paper information, author, conference, etc. In this case, as shown in FIG. 3 (a), the paper-related network may be divided into an information layer based on paper information dimension, an information layer based on author dimension and an information layer based on conference dimension.

Figure 3A:
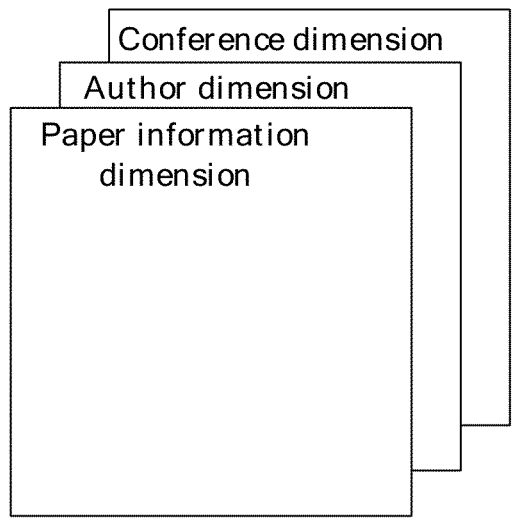
FIGS. 3a and 3b illustrate step 205 in FIG. 2.
Figure 3B:
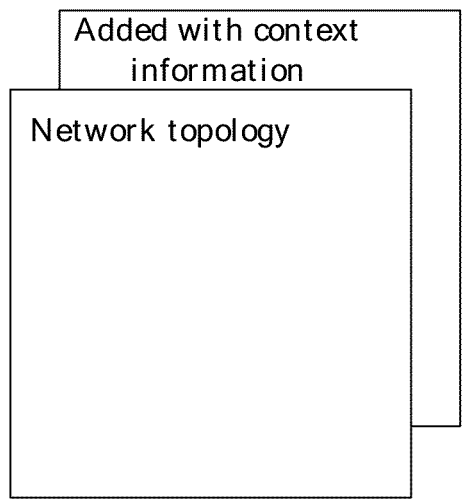
Figure 4A:
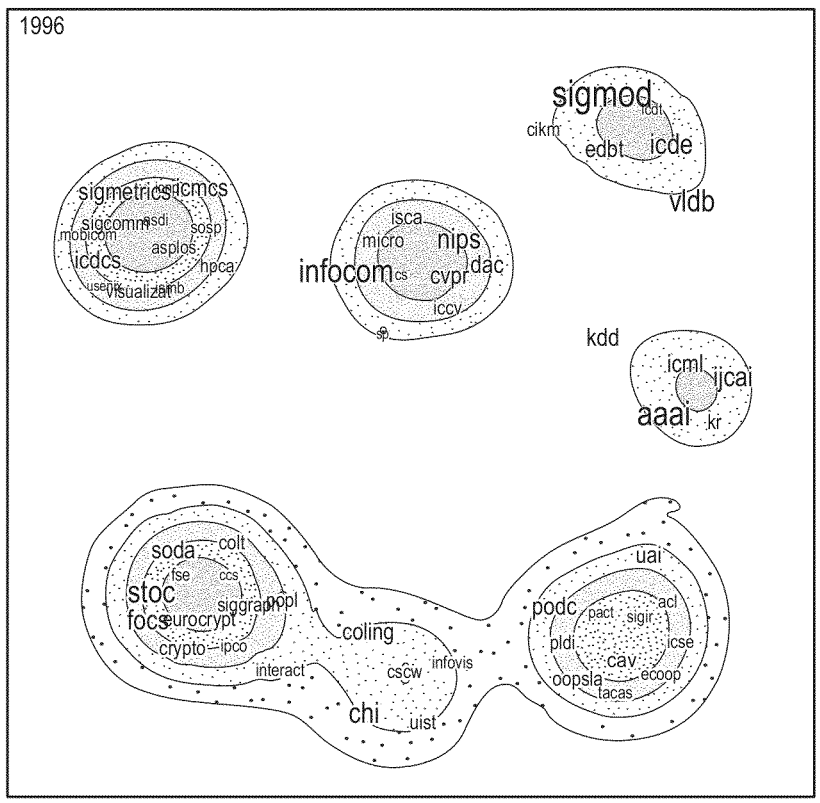
FIGS. 4a -4e illustrate step 210 in FIG. 2.
Figure 4B:
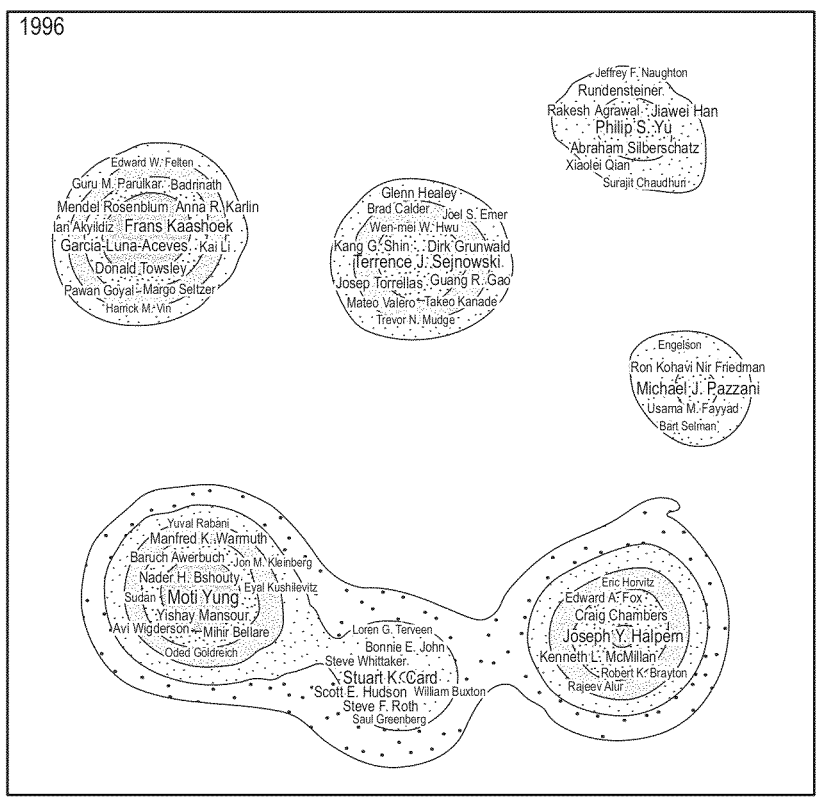
Figure 4C:
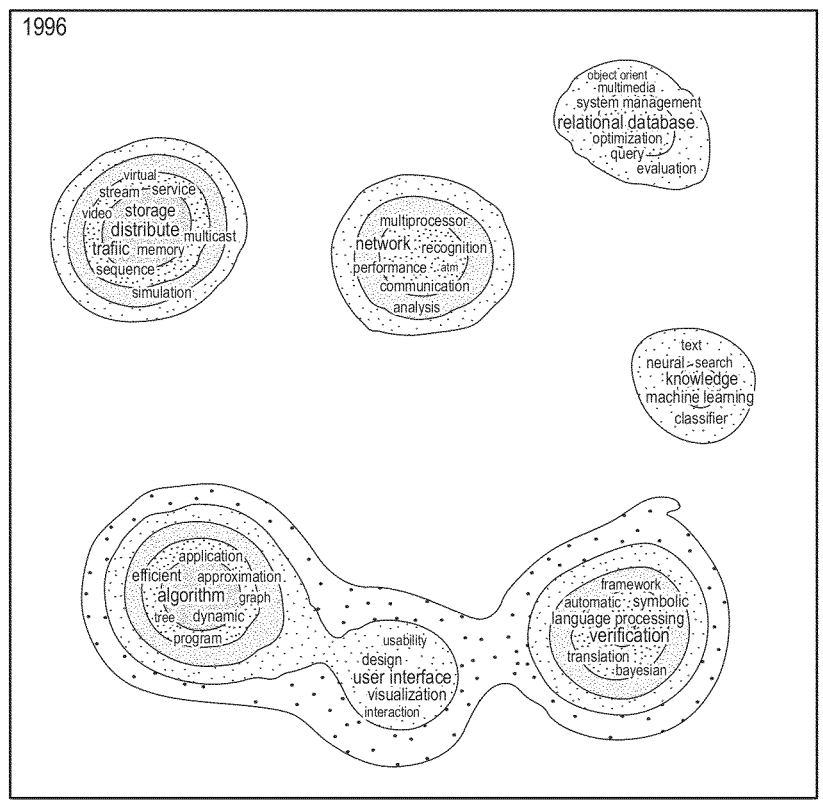
Figure 4D:
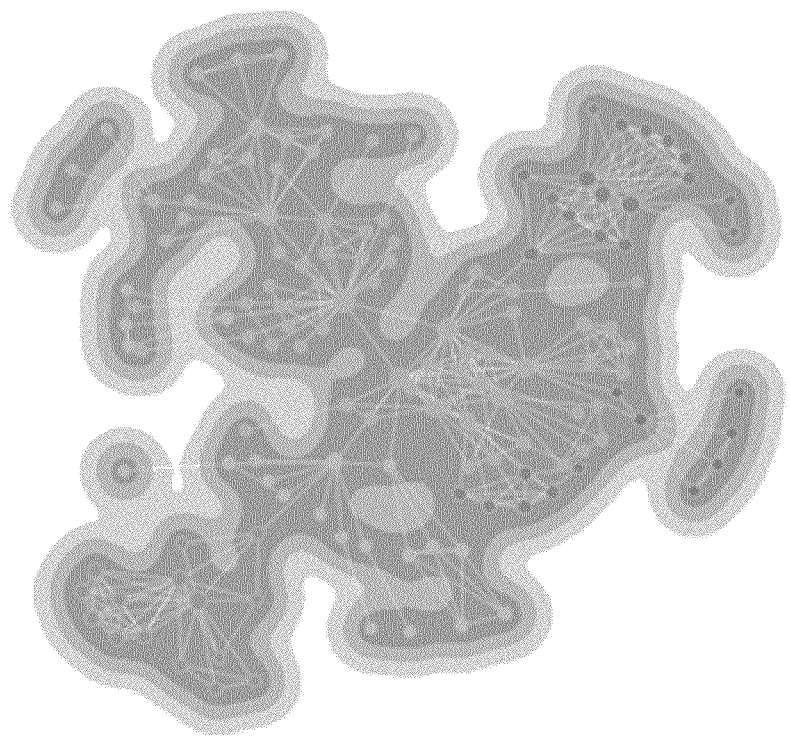
Figure 4E:
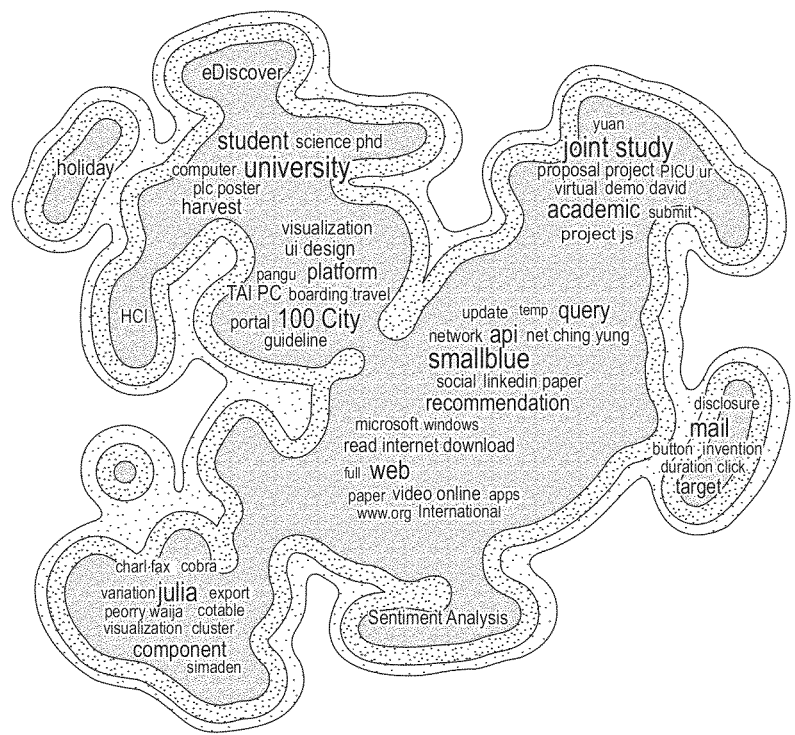

Furthermore, in one particular embodiment, when a data set of a network contains less information dimensions, at this step, also as shown in FIG. 3 (b), the network may be simply divided into an information layer based on network topology and an information layer in which the context information is added on the basis of the network topology, wherein, the information layer based on network topology contains information about the network topology only, i.e. nodes in the network and link relationships among the nodes. Furthermore, the information layer in which the context information is added on the basis of the network topology also contains property descriptions of nodes in the network, in addition to information related to the network topology.

In addition, at this step, an information layer may also be generated based on an information dimension implied rather than directly existing in the data set of the network. For example, for a document-related network, an information layer based on keyword dimension may be generated on the basis of keywords implied in documents. In this case, if the data set of the document-related network gives the documents only while did not directly give keywords contained in the documents, then at this step, it is needed to firstly use an appropriate content extraction model, such as TF-IDF, LDA, etc. to extract keyword information from respective documents, and then to divide the document-related network into an information layers based on keyword dimension on the basis of the extracted keyword information.

At step 210, the plurality of information layers based on different information dimensions are visually processed, respectively, in order to present respective views of the plurality of information layers.

At this step, any existing visualization method in the art may be used to generate views for the plurality of information layers, respectively. For example, a contour map generation method may be used to generate contour maps of the plurality of information layers, respectively.

Furthermore, when the plurality of information layers are visualized respectively, presentation manner of the respective views of the plurality of information layers may be various.

For example, in an embodiment, the respective views of the plurality of information layers may be combined as one view to present to an analyst, while enabling the analyst to switch among the respective views of the plurality of information layers.

In this case, the alpha bending (transparent color processing) technology may be used to combine the views of the plurality of information layers. Specifically, when the analyst focuses on the entire network, color alpha value of each information layer is adjusted to set a larger alpha value for the information layer being focused on while setting smaller alpha values for the other information layers, so that the information layers may overlap. On the other hand, when the analyst wants to focus on some information layer of the plurality of information layers so as to switch to this information layers, the color alpha value of the view of this information layer is changed, so that the view is set as non-transparent, while the views of the other information layers are set as background views and invisible.

In addition, regarding to the switching among the views of the plurality of information layers, a switch button or switch menu may be provided to realize instant switching, or a scroll bar may be provided while using transitionary color alpha value in a smooth manner for the realization. By providing a scroll bar, a smooth transitionary switching among the views of the plurality of information layers can be realized.

In addition, in another embodiment, at this step, the views of the plurality of information layers may also be presented as separate views to the analyst, so that the analyst can watch the views of different information layers of the network simultaneously without switching.

Furthermore, at this step, not only any one existing visualization method in the art may be employed to generate views for the plurality of information layers, respectively, but also a density-based contour map generation method according to an embodiment of the invention may be employed to generate a density-based contour map for at least one of the plurality of information layers.

As to the density-based contour map generation method according to the embodiment of the invention, for intuitive understanding, FIGS. 4 (a)~(c) respectively show exemplary views obtained by using the density-based contour map generation method according to the embodiment of the invention to visualize the information layers of some paper-related network, respectively, in a case where the network is divided into an information layer based on conference dimension, an information layer based on author dimension and an information layer based on keyword dimension, respectively. As noted hereinabove, these views may be processed using alpha bending technology to combine into one view, and the analyst watches each of these views through switching to this one. In addition, these views may be presented as separate views to the analyst as well.

Furthermore, FIGS. 4 (d)~(e) show exemplary views obtained by using the density-based contour map generation method according to the embodiment of the invention to visualize the information layers of some network respectively, in a case where the network is simply divided into an information layer based on network topology and an information layer in which context information is added on the basis of the network topology. Also, these views may be presented in a combination manner or in a separate manner.

In the density-based contour map generation method according to the embodiment of the invention, relationships among nodes are represented by combinations of contour lines and colors. Specifically, in this method, only important nodes are extracted and laid out, and latent nodes which are not extracted and their relationships are represented by contour lines, while the filling colors within the contour lines are used for representing different levels of relationships among nodes. For example, the deeper the filling colors within the contour lines are, the closer the relationships among the nodes within the contour lines will be. In addition, the filling colors within the contour lines are also used for representing information density within the contour lines, the information density being calculated by using the nodes which surround the laid out important nodes and are not presented within the contour lines.

Figure 1A:
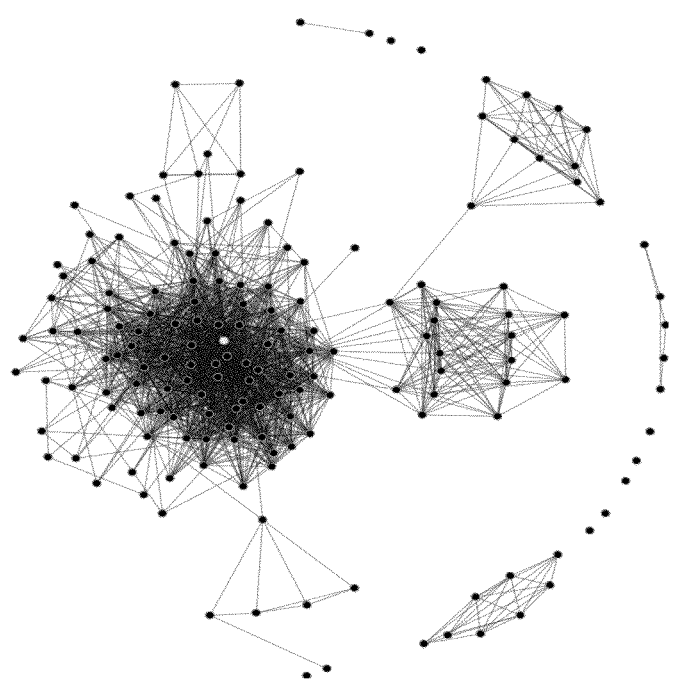
FIGS. 1a and 1b illustrate an existing method for visualization of a social network.
Figure 1B:
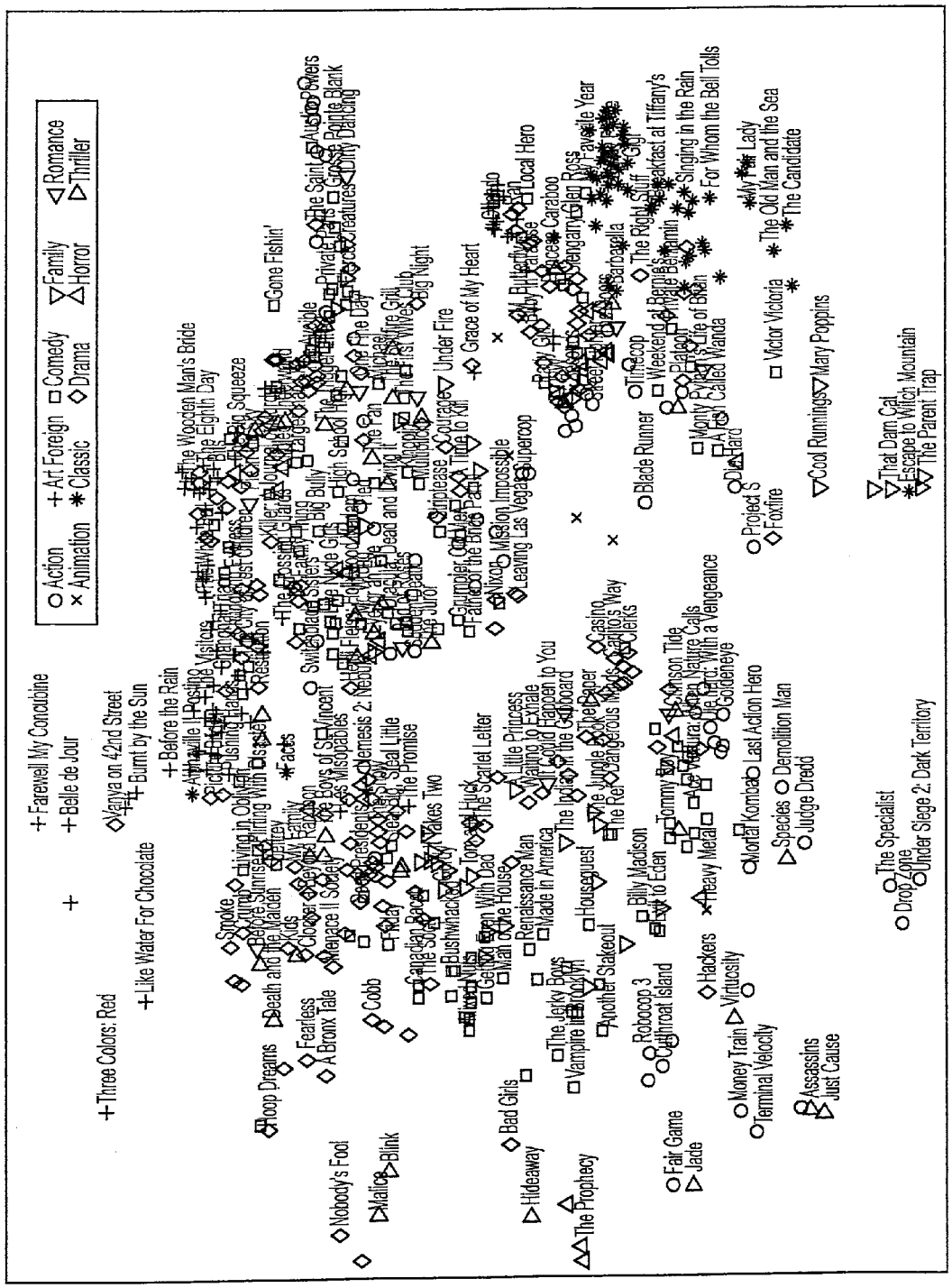

Regarding to the density-based contour map generation method according to the embodiment of the invention, a detailed description is given below in connection with FIGS. 5-8. FIGS. 5-8 are detailed flowcharts showing the process of visualizing at least one of the plurality of information layers based on different information dimensions by using the density-based contour map generation method according to the embodiment of the invention at step 210 of FIG. 1.

Figure 5:
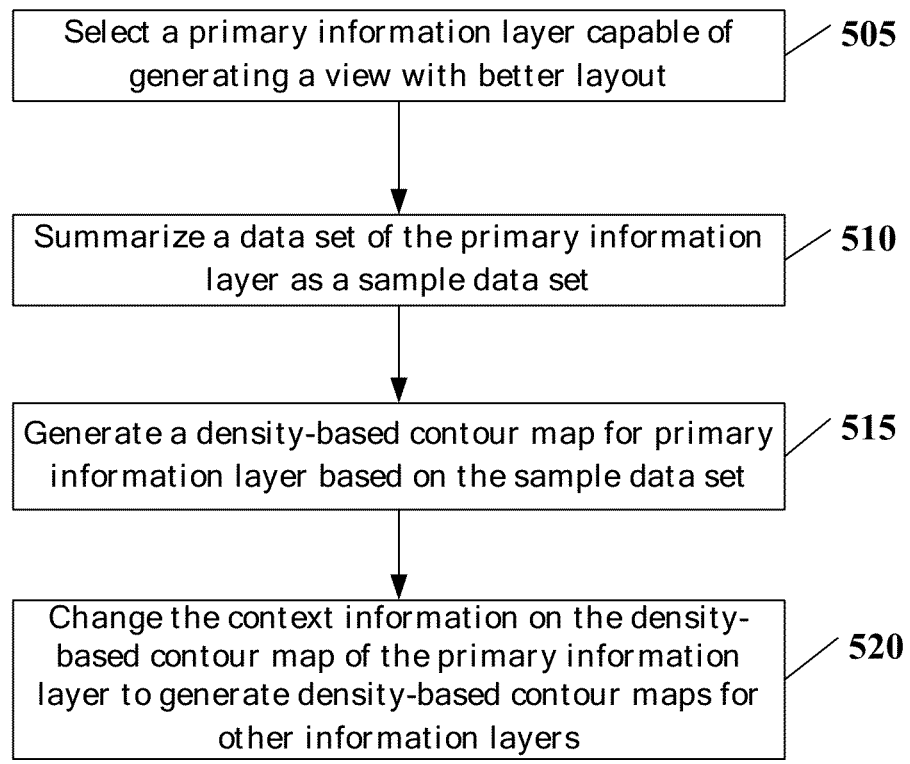
FIG. 5 is a detailed flowchart of step 210 in FIG. 2.

Specifically, as shown in FIG. 5, first at step 505, a primary information layer is selected from the plurality of information layers based on different information dimensions.

At this step, for each of the plurality of information layers, any one existing layout method in the art may be employed to generate a view based on the data set contained by the information layer, and then an information layer which can get a view with best layout effect is selected from the resulting views, as the primary information layer. Specifically, the layout effect of a view may be measured according to the following conditions:

a) with a better topology structure, which can be clearly divided into several parts;
b) with a better symmetrical structure which is evaluated as follows: select the central point of the view (a node with the same or similar distances to the periphery of the view); draw a cross by taking the central point as the center to divide the view into four parts; if the number of nodes in each part is the same or similar, then the view has a good symmetrical structure;
c) with a short average path length which is calculated in this way: select any two nodes in the view to form a node pair; calculate the shortest distances therebetween; and then calculate the average value of the shortest distances of all node pairs existing in the view;
d) the scale of the view is smaller, that is, the number of nodes contained in the view is smaller.

At step 510, the data set contained by the primary information layer is summarized to construct a sample data set containing central nodes and link relationships among the central nodes. The sample data set is used as a layout sample for generating a view for each of the information layers.

In general, the information amount of a data set of a network is very huge, further the information amount of each information layer obtained based on the data set of the network is very huge too, thus if all information of each information layer is presented directly on the view, visual clutter will be caused. Therefore, at this step, before generating a view, the data set of the primary information layer as the layout sample of the view of each information layer is sampled. Of course, the sampled data set should consist of typical data, i.e. important nodes and links therebetween capable of reflecting the overview of the original data set of the primary information layer.

Figure 6:
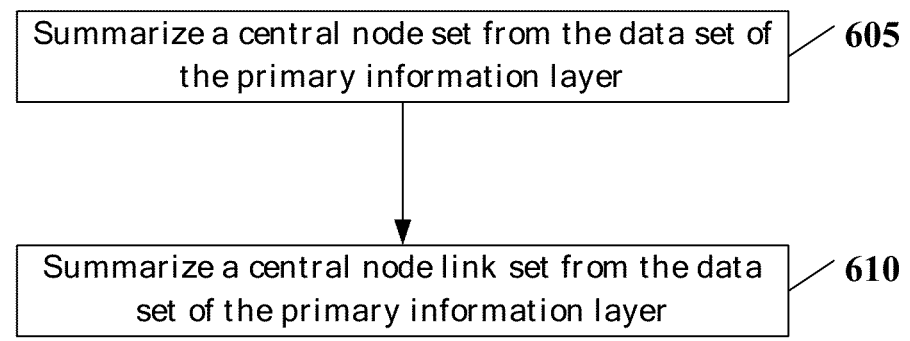
FIG. 6 is a detailed flowchart of step 510 in FIG. 5.

On the step, a detailed description is given in connection with FIG. 6.

As shown in FIG. 6, first, at step 605, a node summarization is performed on the data set of the primary information layer to obtain a central node set containing a plurality of central nodes.

In one embodiment, at this step, node summarization is performed on the data set of the primary information layer based on centricities of node. That is, a plurality of central nodes located at centers surrounded by other nodes are extracted from the data set of the primary information layer to construct the central node set.

Specifically, first of all, the most important node is determined based on the centricity of node, shortest distances between nodes are calculated by taking the most important node as the reference, a plurality of nodes with the furthest distance therebetween are selected as the central nodes. That is to say, it may be considered that the plurality of nodes with the furthest distance therebetween are evenly distributed on different parts of the view. Therefore, extracting these nodes as the central nodes will not lead to a loss of some part of formation, less than great distortion of the resulting view. Those skilled in the art may understand that the centricity of node may be degree centrality, closeness centrality, betweenness centricity, etc.

Figure 7:
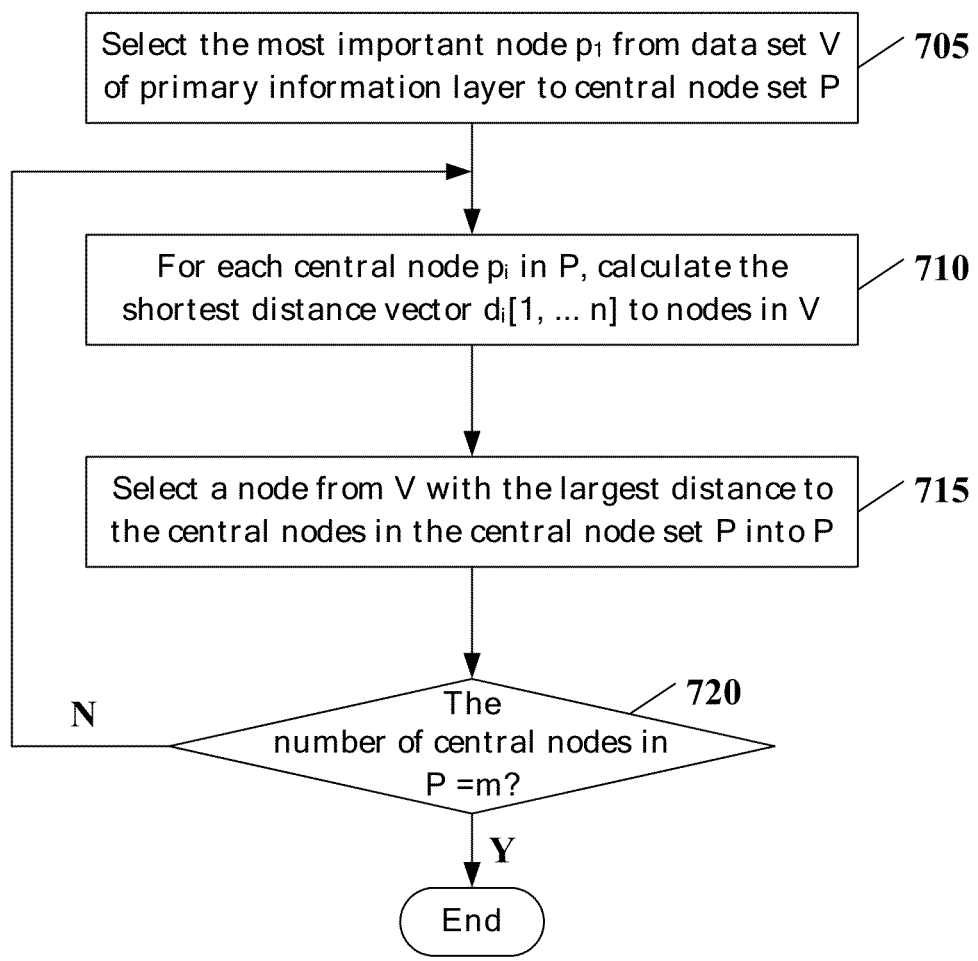
FIG. 7 is a detailed flowchart of step 605 in FIG. 6.

This step may be implemented by the process shown in FIG. 7. In the process shown in FIG. 7, suppose that it is required to summarize a central node set P containing m central nodes from a data set V of the primary information layer.

As shown in FIG. 7, first at step 705, based on the centricity of node, the most important node $p_1$ is selected from the data set V of the primary information layer and moved into the central node set P.

Then, at step 710, for the central node $p_i$ in the central node set P, the shortest distance vector $d_i [1, \ldots n]$ between it and respective nodes in the current data set V of the primary information layer is calculated, wherein n is the number of nodes in the current data set V of the primary information layer.

Here, in the shortest distance vector $d_i [1, \ldots n]$ of each central node $p_i$, the shortest distances between the central node $p_i$ and the respective nodes in the data set V are stored, respectively, i.e., $d_i [1]$ storing the shortest distance from $p_i$ to the first node in the data set V, $d_i [2]$ storing the shortest distance from $p_i$ to the second node in the data set V, and so on.

At step 715, among all central nodes in the central node set P, the shortest distance vectors are compared to select a node from the current data set V of the primary information layer and move it from V into P, the selected node is the one that the shortest distances from it to the central nodes in the central node set P is greater than other nodes in the data set V.

Specifically, firstly, with respect to each central node $p_i$ in the central node set P, based on the shortest distance vector $d_i [1, \ldots n]$ thereof, a node x with the longest distance to the central node $p_i$, i.e. a node whose shortest distance $d_i [x]$ to $p_i$ is maximum is determined in the data set V, then the shortest distances $d_i [x]$ among the furthest nodes x of the respective central nodes $p_i$ are compared and finally a node x whose shortest distance $d_i [x]$ is maximum is determined and moved from the data set V into P.

For example, suppose that there exist two nodes a and b in the central node set P, then first, based on the shortest distance vectors of a and b, a furthest node a1 in the data set V for the node a, as well as a furthest node b1 for the node b are determined, and then the distance between nodes a and a1 is compared with the distance between nodes b and b1, to select the node corresponding to the larger distance therebetween (a1 or b1) and move it from the data set V into the central node set P.

At step 720, it is determined whether the number of the central nodes in the central node set P has reached m; if so, the process ends; otherwise, returns to the step 710.

The above process of FIG. 7 is that further detailing step 605 of FIG. 6.

Next, returning to FIG. 6, at step 610, a link summarization is performed on the respective central nodes in the central node set based on the original data set of the primary information layer to obtain a central node link set containing link relationships among the central nodes.

Since the central nodes in the central node set have been selected as representatives of the related surrounding nodes to them through the summarization of nodes at step 605, the links among these related surrounding nodes shall also be summarized and bound to the corresponding central nodes.

Specifically, at this step, for any two central nodes $p_1$ and $p_2$ in the central node set, the Breadth-First-Search (BFS) algorithm is utilized to find all paths, i.e., edges connecting the two central nodes in the original data set of the primary information layer, and edges whose lengths are smaller than a predetermined maximum length A among these edges are combined by weight as a edge directly connecting the two central nodes p1 and p2 in the central node set to add into the central node link set. For example, suppose there are ten edges e1, e2, . . . en between the central node p1, p2 and the weights of the respective edges are w1, w2, . . . wn, then an edge e whose weight is w1 +w2 . . . +wn, is used to replace the ten edges, and is added into the central node link set, while the ten edges e1, e2, . . . en are deleted from the original data set of the primary information layer.

Furthermore, after the central node link set is obtained, it constitutes the sample data set together with the above central node set.

The above process of FIG. 6 is that further detailing step 510 of FIG. 5. Next, returning to FIG. 5, at step 515, a density-based contour map is generated for the primary information layer by taking the above summarized sample data set as a layout sample.

This step will be described in detail below in connection with FIG. 8.

Figure 8:
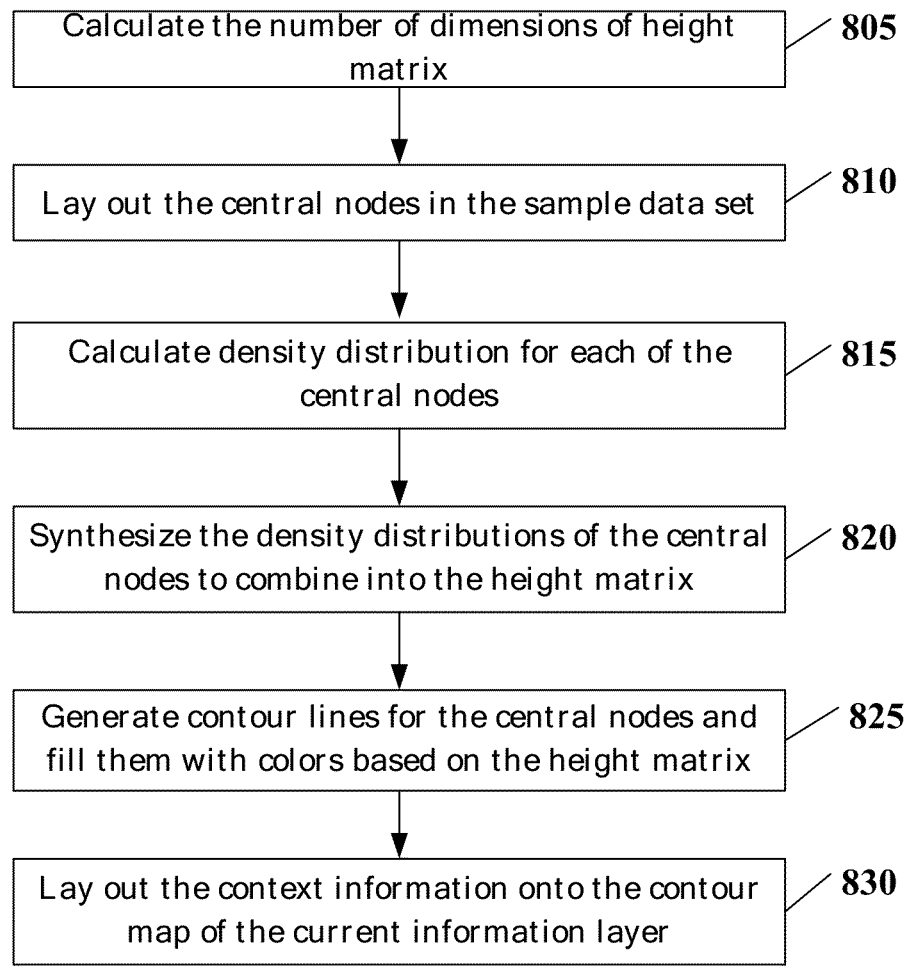
FIG. 8 is a detailed flowchart of step 515 in FIG. 5.

As shown in FIG. 8, first at step 805, the number of dimensions of a height matrix required for generating the contour map.

Any contour line generation algorithm requires a Height matrix as an input. In order to generate a N×N height matrix, at this step, based on the screen size, the number of dimensions N of the height matrix is calculated according to the following formula (1):

$$N = \sqrt{\frac{width * height}{ratio}} \qquad (1)$$

wherein, width and height are width and height of the screen, respectively, and ratio is a constant.

Considering the fact that the greater the number of dimensions N of the height matrix is, the smoother the contour line will be, however, the more time the calculation will cost, it is appropriate to set the constant ratio as 10 according to the experience of the inventors of the present invention.

Then, at step 810, the respective central nodes in the sample data set are laid out onto the screen. That is, the layout of the respective central nodes on the screen is determined based on the central nodes and the link relationships therebetween contained in the sample data set.

At this step, any existing layout method in the art may be used to lay out the central nodes in the above sample data set onto the screen.

At step 815, for each central node in the above sample data set, the density distribution of the central node is calculated by taking the number of its surrounding nodes which are not selected into the sample data set as the mass of the central node.

As the each of the central nodes in the sample data set is summarized from the original data set of the primary information layer as the representative of its surrounding nodes, at this step, the density distribution of the central node is calculated by taking the number of surrounding nodes surrounding the central node as the mass of the central node, so as to reflect the surrounding nodes in the density distribution of the central node.

Specifically, each node in the data set of the primary information layer which is not selected into the sample data set is assigned to the central node nearest to it. Herein assuming that the number of the unselected nodes assigned to the central node i in the data set of the primary information layer is $m_i$, the density distribution f(x) of the central node i is calculated by using the following formula (2):

$$f(x) = \frac{1}{n} \sum_{i=1}^{m} \frac{m_i}{h} K\left(\frac{x - X_i}{h}\right) \qquad (2)$$

wherein, x represents two-dimensional coordinates of some location on the screen, $X_i$ represents two-dimensional coordinates of the central node i on the screen, n is the total number of nodes in the original primary information layer, m is the number of the central nodes in the sample data set, h is bandwidth, and K( ) is a kernel function.

For the kernel function K( ) in the formula (2), existing distribution functions in the art may be used, for example, a Gaussian-Distribution function with zero mean and unit variance, i.e. N(0,1).

In addition, the bandwidth h in the formula (2) is a constant for controlling the smoothing of the obtained density distribution f(x). The smaller h is, the resulting distribution f(x) will gives a set of spikes; the greater h is, the distribution of f(x) will become a uniform distribution. The bandwidth h may be obtained through cross-validation.

Here, in the preferred embodiment, according to the evaluator shown in the following formula (3), the optimal value of the bandwidth h is evaluated by leave-one-out cross-validation:

$$\hat{J}(h) \approx \frac{1}{hn^2} \sum_i \sum_j K^*\left(\frac{X_i - X_j}{h}\right) + \frac{2}{hn} K(0) \qquad (3)$$

where, $K^*(x) = K^{(2)}(x) - 2K(x)$, $K^{(2)}(x) = \int K(x-y)K(y)dy$ and K(x) are Gaussian-Distribution function N(0,1), and $K^{(2)}(x)$ is a Gaussian-Distribution function N(0,2). In other words, according to the formula (3), a value h which minimizes $\hat{J}(h)$ is obtained by leave-one-out cross-validation as the bandwidth constant h.

In order to facilitate understanding, the deduction process of the formula (3) for evaluating the optimal bandwidth h will be described below.

Firstly, the loss function between the density distribution f(x) and its evaluator $\hat{f}(x)$ is defined as follows:

$$L(h) = \int (f(x) - \hat{f}(x))^2 dx = \int f^2(x) dx + \int \hat{f}^2(x) dx - 2\int f(x)\hat{f}(x) dx \qquad (4)$$

Herein, the evaluator $\hat{f}(x)$ is normal distribution, which is defined as:

$$\frac{1}{\sqrt{2\pi}} e^{-\frac{x^2}{2}}$$

That is, the normal distribution density function $\hat{f}(x)$ is the ideal target of the density distribution f(x) in the invention. Since the density distribution f(x) in the present invention is obtained based on the summarized central nodes with consideration of the surrounding nodes of the central nodes, it does not meet normal distribution. However, since the shape of curve of a normal distribution density function is a perfect divergent symmetrical shape and is the target of visualization, the density distribution f(x) in this invention should approximate the normal distribution as possible.

Therefore, the evaluation of the optimal value of the bandwidth h is evaluation of the optimal value h which enables the density distribution f(x) in the present invention to approximate the normal distribution density function $\hat{f}(x)$ as possible.

The above loss function obtains the optimal value h which minimizes $(f(x) - \hat{f}(x))$ by deriving the first order derivative of $(f(x) - \hat{f}(x))$ with respect to h. In the formula (4), since the first item $\int f^2(x)dx$ on the right side is unrelated to the bandwidth h, it may not be considered, whereby the following formula (5) can be obtained through the simplification, so that the optimal bandwidth h is evaluated by minimizing the formula (5).

$$J(h) = \int \hat{f}^2(x) dx - 2\int f(x)\hat{f}(x) dx \qquad (5)$$

Further, on the basis of the formula (5), in order to accelerate the solving speed, the integral is discretized to obtain the evaluator of the formula (3) for evaluate the optimal bandwidth h.

Then, at step 820, the density distributions of the central nodes in the sample data set are synthesized to generate at each coordinate of the height matrix a synthesized density distribution to be combined into the height matrix.

Specifically, at this step, the density distributions of the central nodes are synthesized according to the following formula (6):

$$f(x) = \sum_{all\ P_s\ in\ G} f_s(x) \qquad (6)$$

where, G represents the sample data set, $p_s$ represents some central node in the sample data set G, and $f_s(x)$ is the density distribution of the central node $p_s$.

That is, in the formula (6), for some location x on the screen (x represents the two-dimensional coordinates of that location), since each central node is possible to possess density distribution at that location, the synthesized density distribution at that location is obtained by synthesizing the density distributions of the respective central nodes at that location.

In addition, the combination of the synthesized density distribution and the height matrix is described. As well known to those skilled in the art, the height matrix consists of a plurality of small grids with two-dimensional coordinates, so the combination of the synthesized density distribution and the height matrix is to substitute x in the formula (6) with the two-dimensional coordinates of each small grid in the height matrix to calculate the synthesized density distribution value at the location of the two-dimensional coordinates for the small grid, which is stored in the corresponding small grid.

Then, at step 825, by using the resulting height matrix, contour lines are generated for the respective central nodes which have been already laid out on the screen in the sample data set, and filled with colors to generate the density-based contour map for the primary information layer.

Considering the generated contour lines shall reflect a density-based shape of each central node, at this step, an existing tracking algorithm disclosed at http://members.bellatlantic-.net/~vze2vrva/thesis.html is preferably used to generate the contour lines.

At step 830, the context information in the primary information layer corresponding to the above central nodes is laid out onto the density-based contour map.

At this step, the force directed model is preferably used to lay out the corresponding context information onto the density-based contour map, while avoiding overlapping with the central nodes.

Returning to FIG. 5, an optional step 520 is also comprised. At the optional step 520, by changing the corresponding context information on the density-based contour map of the primary information layer, a density-based contour map is generated for at least one information layer in the plurality of information layers besides the primary information layer.

That is, at the optional step 520, information in the non-primary information layer corresponding to the context information of the central nodes in the primary information layer is laid out onto the contour map of the non-primary information layer, wherein, the contour map of the non-primary information layer is identical with that of the primary information layer.

Here, since the plurality of information layers are all used to represent the same network, and the primary information layer thereof is the one being capable of generating a view with a better layout, it is considered that the layout of the density-based contour map generated based on the data set of the primary information layer may be used directly for other information layers, so that it is can be ensured that not only the views of the respective information layers faithfully present the network overview, but also the views of the respective information layer become those with a better layout. Thus, for the different information layers, since the context information of the network presented by them is different, the only thing required is to change corresponding context information on the density-based contour map of the primary information layer.

However, nodes and context information in the respective information layers are not corresponding to each other one by one, for example, in the case of the paper-related network, one node in the information layer based on conference dimension (one piece of context information) may correspond to a plurality of nodes in the information layer based on paper information dimension (multiple pieces of context information). Therefore, it is needed to perform correspondence and extraction of the context information by taking the primary information layer as the reference. Those skilled in the art can appreciate that many methods in the art may be used to realize the correspondence and extraction of the context information among the plurality of information layers. For example, in the case of taking the conference dimension as the primary information layer and the author dimension as the non-primary information layer, one node in the primary information layer, i.e. one conference node, may correspond to multiple author nodes of conference papers. However, due to layout requirements, it may be needed to select representative author nodes from numerous author nodes and lay out them onto the non-primary information layer. The strategy of selection may be any, including the selection according to the frequency at which the author appears; the selection according to the degree of importance of the author, such as citation times; the selection according to the order of the author, such as whether or not to be the first author.

The above is a detailed description of the method for visualization of the data set of the embodiment. In the present embodiment, by visualizing the network through presenting different overviews of the network from different information dimensions of the network, respectively, the presentation of comprehensive information of the network to a network analyst is ensured while distortion of presented contents as well as visual clutter are prevented, to enable the network analyst to obtain different information on the network clearly from different perspectives according to his/her own needs, thereby obtaining great convenience for the network analysis. In addition, in the present embodiment, for the respective information layers based on different information dimensions of the network, by generating the density-based contour map based on a few important nodes summarized from the data set of the primary information layer, the overall layout of the resulting view can be greatly simplified without distortion.

Under the same inventive concept, the present invention provides a system for visualization of a network which will be described in the following in connection with the drawings.

Figure 9:
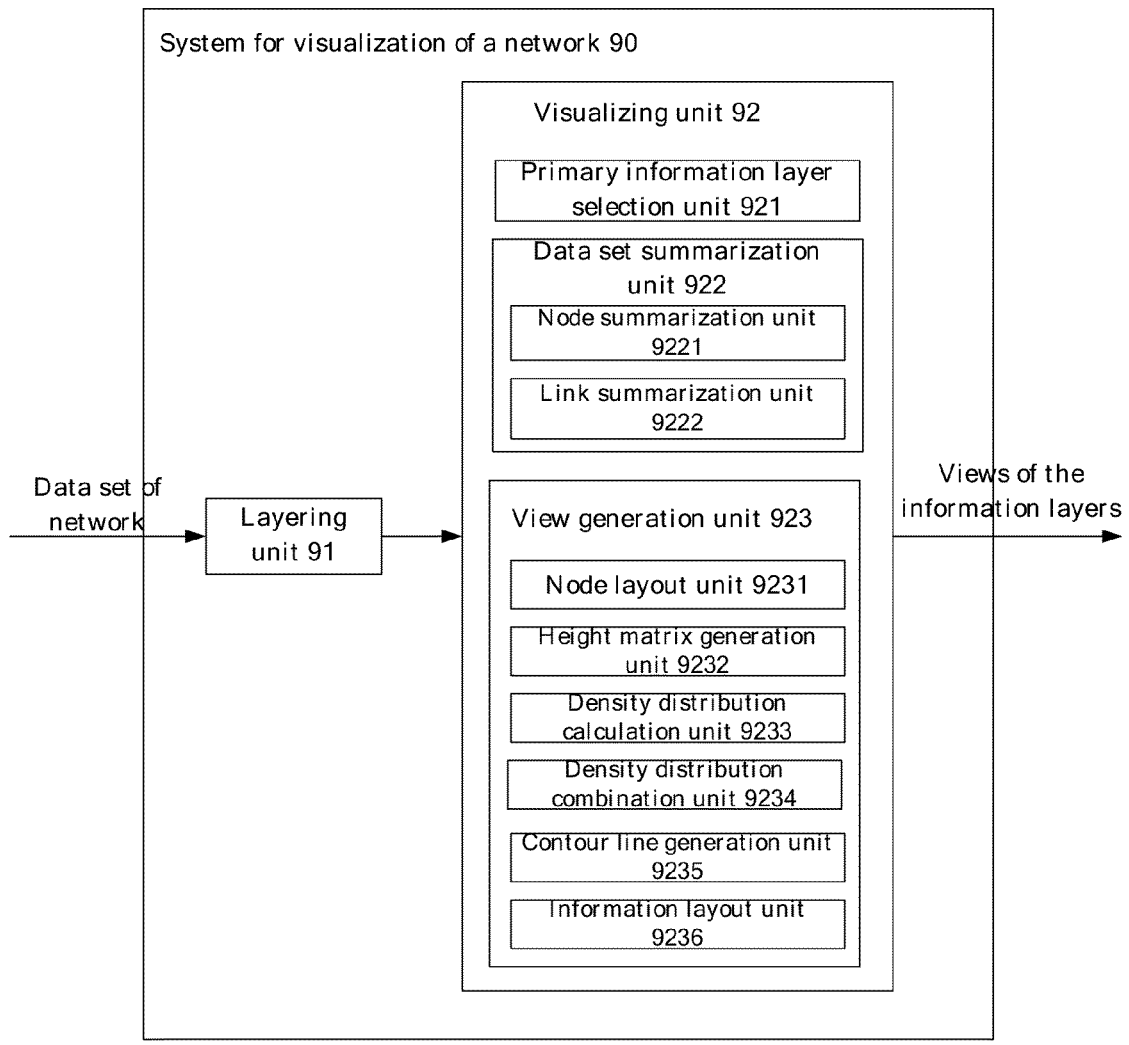
FIG. 9 is a block diagram of a system for visualization of a network according to an embodiment of the invention.

FIG. 9 is a block diagram of a system for visualization of a network according to an embodiment of the present invention. As shown in FIG. 9, the system 90 for visualization of the network in the embodiment comprises: a layering unit 91 and a visualizing unit 92.

Specifically, the layering unit 91 divides the data set of the network into a plurality of information layers based on different information dimensions, wherein each information layer of an information dimension consists of data of this information dimension in the data set of the network.

The visualizing unit 92 visually processes the plurality of information layers based on different information dimensions, respectively, so as to present respective views of the plurality of information layers. In an embodiment, the visualizing unit 92 utilizes the transparent color processing technology to process the respective views of the plurality of information layers to combine them as one view while enabling the switching among the respective views of the plurality of information layers.

As shown in FIG. 9, the visualizing unit 92 may further comprise: a primary information layer selection unit 921, a data set summarization unit 922 and a view generation unit 923.

The primary information layer selection unit 921 selects an information layer capable of generating a view with better layout from the above plurality of information layers based on different information dimensions as the primary information layer.

The data set summarization unit 922 summarizes the data set contained by the primary information layer to construct a sample data set containing central nodes and the link relationships among the central nodes.

As shown in FIG. 9, the data set summarization unit 922 may further comprise a node summarization unit 9221 and a link summarization unit 9222.

The node summarization unit 9221 performs node summarization on the data set of the primary information layer, to obtain a central node set containing a plurality of central nodes. Specifically, the node summarization unit 9221 selects the most important node from the data set of the primary information layer based on the centricity of node, and moves it into the central node set, and performs the following processes in turn, until the number of central nodes in the central node set reaches a predetermined value: for each central node in the central node set, calculating the shortest distance vector between it and the nodes in the data set of the primary information layer which are not selected into the central node set; and selecting a node whose a shortest distance to the central nodes is the shortest from nodes in the data set of the primary information layer which are not selected into the central node set, and moving it into the central node set.

The link summarization unit 9222 performs link summarization on the central nodes in the central node set based on the data set of the primary information layer, to obtain the central node link set containing link relationships among the central nodes. Specifically, for any two central nodes in the central node set, the link summarization unit 9222 utilizes the Breadth-First-Search algorithm to find all paths connecting the two central nodes in the data set of the primary information layer; merges by weight paths whose lengths are smaller than a predetermined maximum length, as a link directly connecting the two central nodes to add into the central node link set.

Next, the view generation unit 923 generates a density-based contour map for the primary information layer by taking the sample data set as the layout sample.

As shown in FIG. 9, the view generation unit 923 may further comprise: a node layout unit 9231, a height matrix generation unit 9232, a density distribution calculation unit 9233, a density distribution combination unit 9234, a contour line generation unit 9235 and an information layout unit 9236.

The node layout unit 9231 lays out the respective central nodes in the sample data set onto the screen.

The height matrix generation unit 9232 generates a height matrix used in generation of contour lines.

The density distribution calculation unit 9233, for each of the central nodes in the sample data set which were laid out onto the screen, calculates the density distribution of the central node by taking the number of its surrounding nodes which are not selected into the sample data set as the mass of the central node. Specifically, the density distribution calculation unit 9233 calculates the density distribution according to the formula (2) for each of the central nodes in the sample data set which were laid out onto the screen.

The density distribution combination unit 9234 combines the density distributions of the respective central nodes calculated by the density distribution calculation unit 9233 into the height matrix for generating contour lines. Specifically, the density distribution combination unit 9234 synthesizes the density distributions of the central nodes in the sample data set according to the formula (6) to generate at each coordinate of the height matrix a synthesized density distribution.

The contour line generation unit 9235 uses the height matrix to generate contour lines for the respective central nodes which were laid out on the screen and fill them with colors, to generate the density-based contour map for the primary information layer.

The information layout unit 9236 lays out the context information in the primary information layer corresponding to the respective central nodes onto the density-based contour map.

The view generation unit 923 also generates a density-based contour map for at least one non-primary information layer in the plurality of information layers besides the primary information layer by changing corresponding context information on the density-based contour map of the primary information layer. Specifically, the view generation unit 923 lays out information in the non-primary information layer corresponding to the context information of the central nodes in the primary information layer onto the contour map of the non-primary information layer, wherein the contour map of the non-primary information layer is identical with that of the primary information layer.

The above is a detailed description of the system for visualization of the network of the invention. Herein, the system and the components thereof can be implemented with specifically designed circuits or chips or be implemented by a computer (processor) executing corresponding programs.

While the method and system for visualization of a data set of the present invention have been described in detail with some exemplary embodiments, these embodiments are not exhaustive, and those skilled in the art may make various variations and modifications within the spirit and scope of the present invention. Therefore, the present invention is not limited to these embodiments, the scope of which is only defined by appended claims.

The invention claimed is:

1. A method for visualization of a data set, comprising:
dividing the data set into a plurality of information layers based on different information dimensions; and
visually processing the plurality of information layers based on the different information dimensions, respectively, in order to present respective views of the plurality of information layers by:
selecting a primary information layer from the plurality of information layers based on the different information dimensions, and summarizing a sub-data set contained by the primary information layer to construct a sample data set containing central nodes and link relationships among the central nodes, the central nodes corresponding to context information in the primary information layer, the summarizing of the sub-data set includes:
performing node summarization on the sub-data set of the primary information layer to obtain a central node set containing a plurality of central nodes, wherein the performing node summarization on the sub-data set of the primary information layer further comprises:
selecting a centricity node from the sub-data set of the primary information layer according to centricity of node to move into the central node set; and
performing in turn, until the number of central nodes in the central node set reaches a predetermined value:
for each central node in the central node set, calculating the shortest distance vector between it and nodes in the sub-data set of the primary information layer which are not selected into the central node set; and
selecting a node whose a shortest distance to the central nodes is the shortest from nodes in the sub-data set of the primary information layer which are not selected into the central node set to move into the central node set.

2. The method according to claim 1, wherein the visually processing further comprises:
utilizing transparent color processing technology to process the respective views of the plurality of information layers to combine them as one view while enabling switching among the respective views of the plurality of information layers.

3. The method according to claim 1, wherein the visually processing further comprises:
generating a density-based contour map for the primary information layer by taking the sample data set as a layout sample.

4. The method according to claim 3, wherein the summarizing further comprises:
performing link summarization on the central nodes in the central node set based on the data set of the primary information layer to obtain a central node link set containing the link relationships among the central nodes.

5. The method according to claim 4, wherein the performing link summarization on the central nodes in the central node set further comprises:
for any two central nodes in the central node set:
utilizing the Breadth-First-Search algorithm to find all paths connecting the two central nodes in the sub-data set of the primary information layer; and
merging paths whose lengths are smaller than a predetermined maximum length by weight, as a link directly connecting the two central nodes to add into the central node link set.

6. The method according to claim 3, wherein the generating a density-based contour map for the primary information layer further comprises:
for each of the central nodes in the sample data set, calculating density distribution of the central node by taking the number of its surrounding nodes which are not selected into the sample data set as the mass of the central node;
combining the density distributions of the respective central nodes in the sample data set into a height matrix for generating contour lines;
using the height matrix to generate contour lines for the respective central nodes and fill them with colors so as to generate the density-based contour map for the primary information layer; and
laying out the context information in the primary information layer corresponding to the respective central nodes onto the density-based contour map.

7. The method according to claim 6, wherein the calculating density distributions of the central nodes further comprises:
for each of the central nodes in the sample data set, the density distribution is calculated according to the following formula:

$$f(x) = \frac{1}{n}\sum_{i=1}^{m} \frac{m_i}{h} K\left(\frac{x - X_i}{h}\right)$$

where, x represents two-dimensional coordinates of some location on the screen, $X_i$ represents two-dimensional coordinates of the central node i on the screen, n is the total number of nodes in the primary information layer, m is the number of the central nodes in the sample data set, $m_i$ is the number of nodes surrounding the central node i in the primary information layer which are not selected into the sample data set, h is bandwidth, and K( ) is a kernel function.

8. The method according to claim 7, wherein the bandwidth h is a value obtained by the cross-validation which minimizes the result of the following formula:

$$\hat{J}(h) \approx \frac{1}{hn^2} \sum_i \sum_j K^*\left(\frac{X_i - X_j}{h}\right) + \frac{2}{hn} K(0)$$

where, $K^*(x) = K^{(2)}(x) - 2K(x)$, $K^{(2)}(x) = \int K(x-y)K(y)dy$ and K(x) are Gaussian-Distribution functions N(0,1), and $K^{(2)}(x)$ is a Gaussian-Distribution function N(0, 2).

9. The method according to claim 7, wherein the combining the density distribution further comprises:
synthesizing the density distributions of the respective central nodes in the sample data set according to the formula to generate at each coordinate of the height matrix a synthesized density distribution:

$$f(x) = \sum_{all\ P_s\ in\ G} f_s(x)$$

where, G represents the sample data set, $p_s$ represents some central node in the sample data set G, and $f_s(x)$ is the density distribution of the central node $p_s$.

10. The method according to claim 3, wherein the visually processing further comprises:
laying out information in a non-primary information layer corresponding to the context information of the central node in the primary information layer onto a contour map of the non-primary information layer, wherein the contour map of the non-primary information layer is identical with that of the primary information layer.

11. A system for visualization of a data set, comprising a processor and a memory, the memory including:
a layering unit configured to divide the data set into a plurality of information layers based on different information dimensions; and
a visualizing unit configured to visually process the plurality of information layers based on the different information dimensions, respectively, in order to present respective views of the plurality of information layers, wherein the visualizing unit comprises:
a primary information layer selection unit configured to select a primary information layer from the plurality of information layers based on the different information dimensions, and
a data set summarization unit configured to summarize a sub-data set contained by the primary information layer to construct a sample data set containing central nodes and link relationships among the central nodes, wherein the central nodes correspond to context information in the primary information layer, wherein the data set summarization unit further comprises:
a node summarization unit configured to perform node summarization on the sub-data set of the primary information layer to obtain a central node set containing a plurality of central nodes; and wherein the node summarization unit:
selects a centricity node from the sub-data set of the primary information layer according to centricity of node to move into the central node set; and
in turn, until the number of central nodes in the central node set reaches a predetermined value:
for each central node in the central node set, calculates the shortest distance vector between it and nodes in the sub-data set of the primary information layer which are not selected into the central node set; and
selects a node whose a shortest distance to the central nodes is the shortest from nodes in the sub-data set of the primary information layer which are not selected into the central node set to move into the central node set.

12. The system according to claim 11, wherein the visualizing unit utilizes transparent color processing technology to process the respective views of the plurality of information layers to combine them as one view while enabling switching among the respective views of the plurality of information layers.

13. The system according to claim 11, wherein the visualizing unit further comprises:
a view generation unit configured to generate a density-based contour map for the primary information layer by taking the sample data set as a layout sample.

14. The system according to claim 13, wherein the data set summarization unit further comprises:
a link summarization unit configured to perform link summarization on the central nodes in the central node set based on the sub-data set of the primary information layer to obtain a central node link set containing link relationships among the central nodes.

15. The system according to claim 14, wherein the link summarization unit for any two central nodes in the central node set:
utilizes the Breadth-First-Search algorithm to find all paths connecting the two central nodes in the sub-data set of the primary information layer; and
merges paths whose lengths are smaller than a predetermined maximum length by weight, as a link directly connecting the two central nodes to add into the central node link set.

16. The system according to claim 13, wherein the view generation unit further comprises:
a density distribution calculation unit configured to for each of the central nodes in the sample data set, calculates density distribution of the central node by taking the number of its surrounding nodes which are not selected into the sample data set as the mass of the central node;
a density distribution combination unit configured to combine the density distribution of the respective central nodes in the sample data set into a height matrix for generating contour lines;
a contour line generation unit configured to use the height matrix to generate contour lines for the respective central nodes and fill them with colors, so as to generate the density-based contour map for the primary information layer; and
an information layout unit configured to lay out the context information in the primary information layer corresponding to the respective central nodes onto the density-based contour map.

17. The system according to claim 16, wherein the density distribution calculation unit for each of the central nodes in the sample data set, calculates the density distribution according to the following formula:

$$f(x) = \frac{1}{n}\sum_{i=1}^{m} \frac{m_i}{h} K\left(\frac{x - X_i}{h}\right)$$

where, x represents two-dimensional coordinates of some location on the screen, $X_i$ represents two-dimensional coordinates of the central node i on the screen, n is the total number of nodes in the primary information layer, m is the number of the central nodes in the sample data set, $m_i$ is the number of nodes surrounding the central node i in the primary information layer which are not selected into the sample data set, h is bandwidth, and K( )is a kernel function.

18. The system according to claim 17, wherein the bandwidth h is a value obtained by the cross-validation which minimizes the result of the following formula:

$$\hat{J}(h) \approx \frac{1}{hn^2} \sum_i \sum_j K^*\left(\frac{X_i - X_j}{h}\right) + \frac{2}{hn} K(0)$$

where, $K^*(x) = K^{(2)}(x) - 2K(x)$, $K^{(2)}(x) = \int K(x-y)K(y)dy$ and K(x) are Gaussian-Distribution functions N(0,1), and $K^{(2)}(x)$ is a Gaussian-Distribution function N(0,2).

19. The system according to claim 17, wherein the density distribution combination unit synthesizes the density distributions of the respective central nodes in the sample data set according to the formula to generate at each coordinate of the height matrix a synthesized density distribution:

$$f(x) = \sum_{all\ P_s\ in\ G} f_s(x)$$

where, G represents the sample data set, $p_s$ represents some central node in the sample data set G, and $f_s(x)$ is the density distribution of the central node $p_s$.

20. The system according to claim 13, wherein the view generation unit lays out information in a non-primary information layer corresponding to the context information of the central nodes in the primary information layer onto a contour map of the non-primary information layer, wherein, the contour map of the non-primary information layer is identical with that of the primary information layer.

* * * * *